Dec. 20, 1966 J. BELLIER 3,293,139
PRESTRESSED CONCRETE PRESSURE VESSEL FOR NUCLEAR REACTORS
Filed April 24, 1964 2 Sheets-Sheet 1

INVENTOR
JEAN BELLIER
BY Bacon & Thomas
ATTORNEYS

United States Patent Office 3,293,139
Patented Dec. 20, 1966

3,293,139
PRESTRESSED CONCRETE PRESSURE VESSEL FOR NUCLEAR REACTORS
Jean Bellier, Garches, France, assignor to Commissariat a l'Energie Atomique, Paris, Seine, France
Filed Apr. 24, 1964, Ser. No. 362,245
Claims priority, application France, May 8, 1963, 934,050
6 Claims. (Cl. 176—58)

The present invention relates to a prestressed concrete pressure vessel for nuclear reactors of the type which are cooled by a circulation of gas under pressure.

In known reactors of this type, the heat generated is removed from the reactor by a gas—usually carbon dioxide gas—at a maximum value of pressure which is compatible with the mechanical strength of the reactor containment vessel, the object achieved being to improve the process of heat transfer between the gas and the fuel elements.

In the case in which the pressure vessel is constructed of prestressed concrete, it is known to ensure gas-tightness by means of a steel lining membrane or "skin" which covers the entire internal wall of the vessel.

In the pressure vessels at present known—whether such vessels are used on reactors which are currently in service or which are either under construction or under design—the internal walls thereof are maintained at a fairly low temperature by means of a special cooling system so as to avoid the adverse effects of excessive temperature on the concrete and in order to ensure that the thermal expansion stresses in the concrete do not give rise in the structure as a whole to insuperable mechanical strength problems.

The above-mentioned cooling system can be of a number of kinds:

(a) The system consists, for example, of a secondary gas circuit which is arranged within the interior of the pressure vessel, said circuit being separate from the main heat-removal circuit and so arranged that the entire internal wall is in contact with the secondary-circuit gas, the inlet temperature of said secondary-circuit gas and the flow rate of this latter being regulated as a function of the maximum permissible temperature.

(b) The system can comprise water-circulation coils which are mounted against the gas-tight lining membrane on the same side as the concrete and which are fed in such manner that the temperature of the lining membrane does not exceed the maximum permissible value, it being accordingly necessary to cover the lining membrane on the inside with a heat insulation which is intended to create a high thermal gradient with a view to reducing to a minimum the amount of heat to be removed by said secondary water.

Such devices are subject to disadvantages irrespective of the arrangements and expedients employed. In the first place, they entail a loss of heat and a power consumption which are detrimental to the efficiency of the plant. In the second place, on account of the large number of components employed, such devices involve additional risks of fault conditions during operation. Furthermore, the system which consists of a secondary internal gas circuit entails the need for:

Internal partition walls essentially designed to withstand differential pressures which are not negligible;

Large gas inlet and outlet orifices in addition to the very large orifices for the primary gas;

Blowers;

Specialized heat exchangers;

the result achieved by such expedients being to complicate the installation and increase the capital cost.

Moreover, whereas the water circulation system located next to the lining membrane admittedly calls for less external equipment, this system nevertheless invariably entails a complication of the installation; a further consideration is that the composition of the heat insulation sets very difficult problems on account of the pressure to which it is subjected and also on account of nuclear requirements regarding the nature of the heat insulation.

The primary object of the present invention is to overcome the disadvantages noted above; to this end, the invention proposes a prestressed concrete pressure vessel for nuclear reactors comprising a gas-tight steel membrane which serves as a lining for a chamber which is delimited by said pressure vessel and through which circulates a gas under pressure for the purpose of cooling the reactor, said pressure vessel consisting of a cylindrical shell, two bases which are separate from the shell and each disposed at one end of said shell and prestressing cables for the purpose of assembling said shell and said bases, the cylindrical shell at least consisting of an outer zone of "active concrete" which is alone traversed by the prestressing cables and an inner zone of "passive concrete" which is subdivided by transverse and axial slots formed in said inner zone into a plurality of segments, whilst the inner zone serves as heat insulation for the concrete of the outer zone and also serves to transfer to said outer zone the pressure forces exerted by the coolant gas on the gas-tight lining membrane.

A prestressed concrete pressure vesssel according to the invention is illustrated by way of non-limitative example in the accompanying drawings, wherein.

Figure 1:
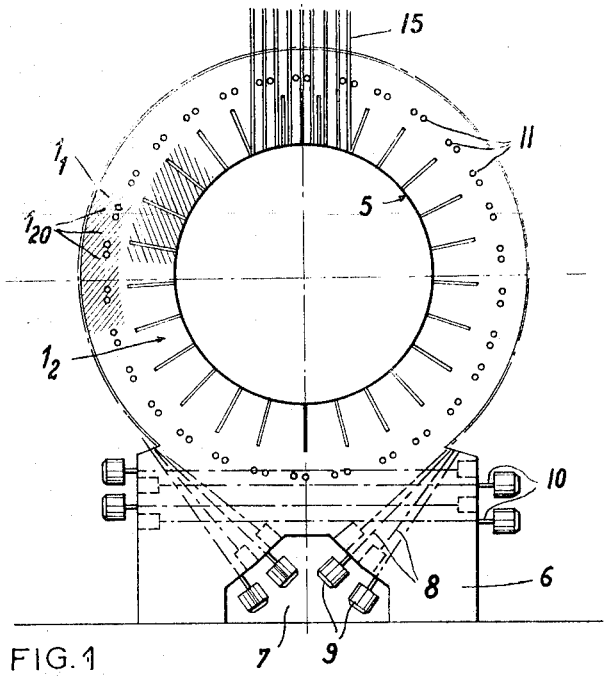
FIG. 1 is a transverse sectional view of a pressure vessel in a first form of embodiment according to the invention.
Figure 2:
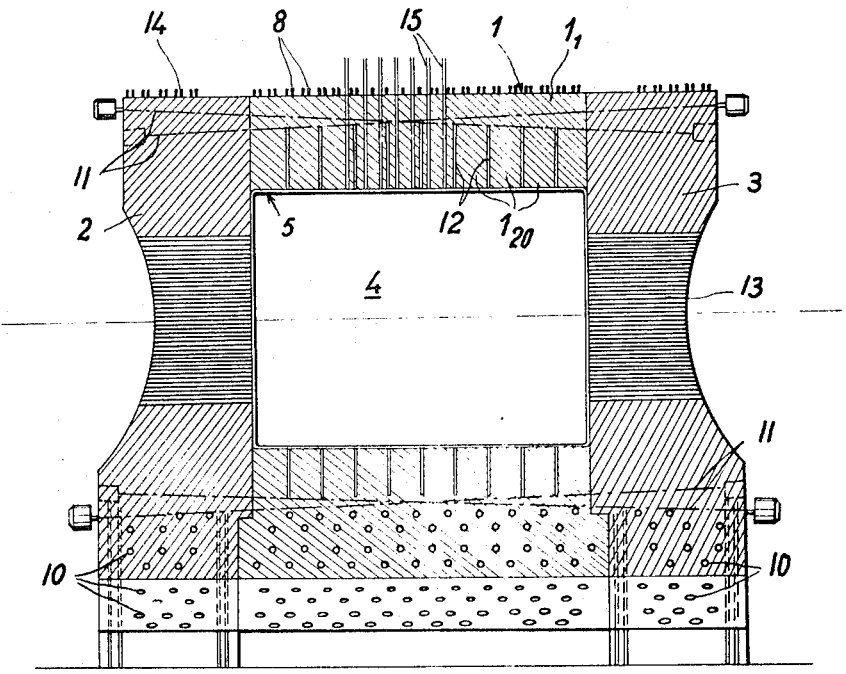
FIG. 2 is a longitudinal sectional view looking on the right-hand side of FIG. 1.

The prestressed concrete pressure vessel in accordance with the invention as illustrated in FIGS. 1 and 2 which show a first form of embodiment thereof essentially consists of a cylindrical shell 1 and two bases or end sections 2 and 3, there being formed between these parts a vault 4 containing the reactor core proper including support structures and casing (which have not been shown in the drawings).

The gas-tightness of the above-mentioned vault 4 in which a coolant gas circulates as will be described below is ensured at the exterior by means of a sheet metal seal or leak-tight lining membrane 5 which is in contact with the internal faces of the cylindrical shell 1 and the end sections 2 and 3 of the containment vessel. FIG. 1 shows more precisely the arrangement of the concrete pillars 6 which support the entire core and containment structure as well as the arrangement of a servicing gallery 7 which is formed between the pillars 6. In FIGS. 1 and 2, there are additionally shown at 8 the circular prestressing hoops of the cylindrical containment shell 1, said hoops 8 being adapted to terminate on heads 9 placed within the servicing gallery 7 and being additionally tensioned at the lower portion of the vessel by means of transverse cables 10 which complete the transverse prestressing, the longitudinal prestressing cables being shown at 11.

In accordance with the invention, at least the concrete of the cylindrical shell 1 of the pressure vessel is divided into two zones $1_1$ and $1_2$, only the first zone being traversed by the longitudinal prestressing cables 11. The outer zone $1_1$ is designed in the usual manner and its function is to provide the vessel with mechanical resistance, that is to say to accumulate in the form of elastic compression the prestressing force which, with a certain degree of tolerance, has to balance the ultimate pressure or bursting force.

The inner zone $1_2$ is subdivided, for example, in both the transverse direction and axial direction into a plurality of separate segments $1_{20}$ by means of an orthogonal system, for example, of open joints 12, the opening of each joint being additionally intended to correspond to the anticipated expansion of the segments under the action of heating. Each segment $1_{20}$ transmits to the zone $1_1$ or so-called "active concrete" zone the thrust resulting from the gas pressure within the vault 4 but cannot induce expansion stresses either in the circular direction or in the transverse direction. All the thermal stresses in zone $1_1$ are not thereby eliminated since this so-called "active concrete" zone is also subjected to heating which is reduced, however, as a result of the heat insulation provided by the zone $1_2$ or so-called "passive concrete" zone.

As an alternative form which is also worthy of note, it is possible to divide the end sections or bases 2 and 3 of the vessel into two zones, one zone being the so-called "active concrete" zone and the other zone being the so-called "passive concrete" zone. This division is carried out on the same principles and produces the same consequences as those which have been examined earlier in reference to the cylindrical shell 1.

In this case, the depth of the boundary between the two zones of active concrete and passive concrete must depend on the different considerations outlined in the foregoing, taking into account especially the effect of expansion stresses on the resistance of the end sections; in this form of embodiment of the vessel, the end sections have a concave domical configuration and are traversed by charge tubes or discharge tubes 13, prestressing being carried out by means of hoops 14 placed around the periphery of each end section.

In the containment vessel which is illustrated in FIGS. 1 and 2, the gas-tight lining membrane 5 is anchored in the internal concrete structure of the cylindrical shell 1 and of the end sections 2. The said lining membrane is traversed in particular by coolant ducts for admission and discharge of gas into and from the vault 4 as well as at the top portion of the vessel by tubes 15 through which the control rods are intended to pass towards the reactor core which is placed within said vault 4.

Since the aforesaid gas-tight lining membrane 5 is subjected to the same thermal expansion stresses as the concrete which is immediately adjacent thereto by reason of the similar coefficients of expansion of the two materials, the anchorages are not subjected to stress to any appreciable extent.

The open space in the joints between the segments of the "passive concrete" zones of the cylindrical shell 1 and if necessary of the end sections 2 and 3 is preferably filled with a compressible heat-insulating material, this arrangement being intended to minimize heat losses. Since the spaces 12 are in principle at atmospheric pressure and remain so, the type of filling material employed presents no difficulty.

In this first form of embodiment of the reactor containment vessel in accordance with the invention as well as in the second form of embodiment which will also be described below, the heat which the internal wall of the concrete shell is capable of receiving is discharged through the entire thickness of said shell. Taking account of said thickness and the low thermal conductivity of the material, the heat loss is relatively small.

It is of interest to note that, as an alternative form, there is a possibility of practically eliminating the heating of the "active concrete" zone and consequently of eliminating the corresponding stresses by interposing at the boundary of the two zones, namely of the "active concrete" zone and of the "passive concrete" zone, a cooling system whose power can be reduced as an intrinsic function of the thickness which is given to the so-called "passive concrete" zone.

In any case the temperature of the inner wall—or more exactly of the gas-light lining membrane—is not permitted to reach any indeterminate value. The circulation of the inlet gas is accordingly made to take place in such a manner that the internal wall of the containment vessel is completely in contact with the said inlet gas which therefore imposes its temperature on said wall. This temperature is distinctly in excess of 100° C. in modern reactors.

The heating hereinabove referred-to can be withstood by the types of concrete at present in use even though it may be necessary to make a special choice of the constituents. Besides, in accordance with the invention, the concrete is only require to retain its cohesion and the property of withstanding compressive stresses of the order of only a few hundred pounds per square inch, which is of the same order of magnitude as the gas pressures which are employed.

As regards the problem of expansion stresses induced by the heating defined above, that is to say more exactly the stresses which the expansional movements induce within the structure, this problem is solved by differentiating mechanically the inner layer of concrete from the remainder of the shell. This differentiation will prevail up to the point when the external cooling action eventually lowers the temperature to a value of the same order, for example, as that which is usual in conventional structural engineering practice. Accordingly, the shell is divided into an inner hot layer of concrete and an outer layer which is considered to be at normal or next to normal temperature.

In the pressure vessel in accordance with the invention, fatigue resulting from thermal stress is minimized at all points, so that prestressing can consequently be applied more exclusively for the purpose of providing resistance to the action of pressure. The result thereby achieved is that it becomes possible either to increase the pressure in respect of equal dimensions or to increase the dimensions, while an increase both in pressure and dimensional values can in turn produce an increase in reactor power for a same total prestressing force.

Figure 3:
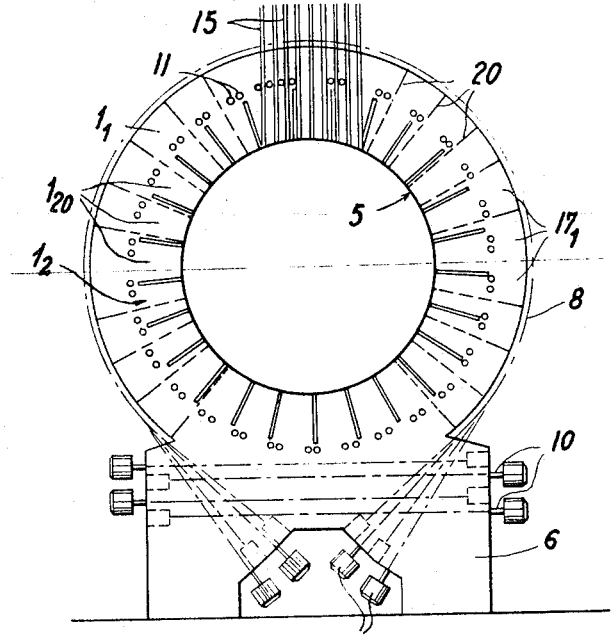
FIG. 3 is a transverse sectional view of a pressure vessel in a second form of embodiment according to the invention.
Figure 4:
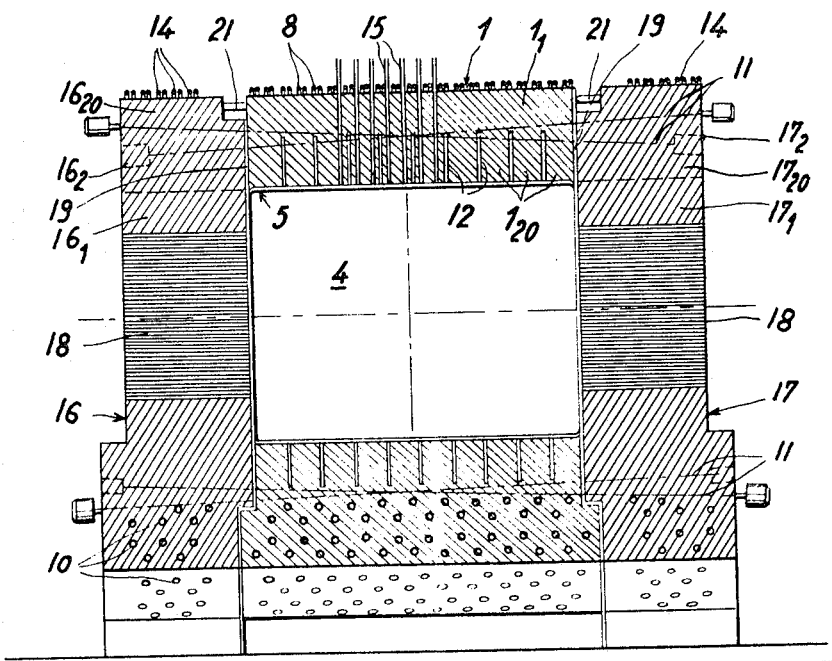
FIG. 4 is a longitudinal sectional view looking on the right-hand side of FIG. 3.

According to a second form of embodiment of the pressure vessel in accordance with the invention, said vessel comprises, as shown in FIGS. 3 and 4 of the accompanying drawings, and apart from the elements which have already been described in connection with the first form of embodiment, two end sections or bases 16 and 17 each having the shape of a flat circular disc of substantial thickness.

Each end section 16–17 works under bending stress and is of course prestressed beforehand in correspondence with the design bending stress by means of prestressing hoops or bands 14. The said end sections 16, 17 are additionally traversed by charge or discharge tubes 18 which are employed for the purpose of inserting or removing radioactive cartridges into or from the reactor core which is placed within the vault 4. The charge or discharge tubes 18, which have better conductivity than the concrete which forms the end sections 16–17, perform the function of heat antennae which partially short-circuit the heat-insulating concrete and thus bring the entire end section to a higher mean temperature. Moreover, the thermal stresses in the end sections are higher than in the vessel according to the first form of embodiment by reason of the fact that, in the flat disc which constitutes each end section, it is impossible to balance expansion stresses by means of a variation of curvature as in the case of the domical end which is contemplated in the first form of embodiment.

In this second form of embodiment, each end section 16–17 is made mechanically separate from the cylindrical shell 1 of the containment vessel by means of a sharp break 19 which permits the free expansion of the end section 16 or 17 in the plane thereof.

On closer examination of the behaviour of each end section 16–17 of the vessel, it is observed that only the central portion $16_1$ or $17_1$ of the end section 16 or 17, namely the area which is projected from the interior of the vessel and which corresponds to the cross-section of the vault 4, is heated whereas the concrete which surrounds this central portion $16_1$ or $17_1$ remains approximately at the temperature prevailing externally of the vessel. The peripheral portion $16_2$ or $17_2$ of the end section 16 or 17 is therefore subjected annularly to extension stress when the central portion $16_1$ or $17_1$ of the end section tends to expand.

Inasmuch as it proves difficult in practice to counteract this extension stress by means of an increase in the circular prestress induced by the hoops 14 (such a practice would be costly and could result, when the vessel is in the cold state and under no load, in compressive stress in the concrete of the end sections which would be in excess of permissible limits), provision is made in accordance with the invention for an annular recess $16_2$ or $17_2$ which is "cut-out" in the concrete so as to form separate fins $16_{20}$ or $17_{20}$ by means of radial joints 20 which are designed to open when the disc-shaped end section becomes heated. The fins $16_{20}$ or $17_{20}$ which are formed between the joints 20 permit the possibility of transferring to the central zone $16_1$ or $17_1$ the prestressing force which is applied by the hoops 14 on the end section 16 or 17.

The joints 20 extend towards the center up to a distance such that the fins $16_{20}$ or $17_{20}$ contain the longitudinal cables 11 whose function is to restrain the end sections.

When the vesesl is pressurized, the cables 11 are tensioned and suffice for the purpose of restraining the end sections 16–17 independently of any longitudinal stress. The said cables 11 are initially pre-drawn only to a slight extent and, under load, merely play the part of simple passive suspension cables. Under no load, the low initial tension is sufficient to apply the end sections 16–17 against the cylindrical shell 1. However, provision must be made for the case in which, at zero gas pressure, the temperature rises within the reactor vessel or else for the case in which, as a result of a fault condition, the pressure drops after a certain time of reactor operation at power.

With this end in view, provision is made between each end section 16–17 and the cylindrical shell 1 for a ring of connecting-rods 21 by means of which each end section 16–17 is applied under no load against the cylindrical shell 1. Each ring of connecting-rods 21 is constructed either of reinforced concrete or of metal; a double articulation permits of either expansional or contractional movements of the end section in the plane of this latter, these movements being free solely on the condition that the cables 11 are not immobilized within their sheaths.

In the case of a reactor containment vessel in which gas such as $CO_2$ enters at a temperature of the order of 150° C. and passes out at a temperature of approximately 300° C. at a working pressure of the order of 250 t./m.$^2$, the vessel having a diameter of approximately 28 meters in the case of the cylindrical shell and end sections, a length (including end sections) of the order of 37 meters and an internal vault approximately 16 meters in diameter and 21 meters in length, the relative displacements of the end sections 16–17 and of the cylindrical shell 1 would accordingly be within the range of one centimeter.

It is useful to note in this connection that these relative displacements result in the need to adopt special arrangements in order to join that portion of the gas-tight lining membrane which is anchored in the cylindrical shell 1 of the vessel to the steel sheets which form the end portions of the lining membrane proper.

It will accordingly be possible to make use of the elastic deformation of curved plates, or else to provide the necessary flexibility by securing the end sheet by means of rods which are designed to bend transversely, such rods necessarily providing a passageway for the charge-tube and discharge-tube standpipes.

In this latter case, recourse will be had to uniformly distributed flexibility instead of localized flexibility, the results produced being in any case very much the same.

The drawings which relate to the two above-described forms of embodiment show reactor vessels of the horizontal axis type. However, it will readily be apparent that the invention also applies to a reactor vessel of the vertical axis type in which the relative displacements in the radial direction between the ends and the cylindrical body or shell offer the advantage of being directed about an axis and not in a plane of symmetry.

It will further be understood that the invention is not limited in any sense to the forms of embodiment which have been described and illustrated.

Other modes of execution and forms of embodiment could be adapted if necessary without thereby departing from the scope or spirit of this invention.

What I claim is:

1. Prestressed concrete pressure vessel for nuclear reactors comprising a gas-tight steel membrane which serves as a lining for a chamber which is delimited by said pressure vessel and through which circulates a gas under pressure for the purpose of cooling the reactor, said pressure vessel consisting of a cylindrical shell, two bases which are separate from said shell and each disposed at one end of said shell and prestressing cables for the purpose of assembling said shell and said bases, the cylindrical shell at least consisting of an outer zone of "active concrete" which is alone traversed by the prestressing cables and an inner zone of "passive concrete" which is subdivided by transverse and axial slots formed in said inner zone into a plurality of segments, whilst the inner zone serves as heat insulation for the concrete of the outer zone and also serves to transfer to said outer zone the pressure forces exerted by the coolant gas on the gas-tight lining membrane.

2. Pressure vessel in accordance with claim 1, wherein each base of the vessel consists of a concave domical end.

3. Pressure vessel in accordance with claim 2, wherein a heat removal circuit is disposed at the boundary of the two concrete zones of the cylindrical shell of said vessel.

4. Pressure vessel in accordance with claim 1, wherein each base of the vessel consists of a flat disc.

5. Pressure vessel in accordance with claim 4, wherein a peripheral zone of the lateral face of each base is divided by a plurality of radial joints into a plurality of separate fins on the terminal faces of which prestressing hoops are applied.

6. Pressure vessel in accordance with claim 5, wherein each base is made mechanically separate from the cylindrical shell by means of a sharp break which permits the free expansional movement of the base in the plane thereof, said base being applied against said cylindrical shell by means of a ring of connecting-rods which is disposed between these two parts.

References Cited by the Examiner

FOREIGN PATENTS 861,513   2/1961   Great Britain.

REUBEN EPSTEIN, *Primary Examiner.*